United States Patent
Min et al.

(10) Patent No.: US 9,381,816 B2
(45) Date of Patent: Jul. 5, 2016

(54) METHOD FOR RECONNECTING A RELAY IN A VEHICLE BATTERY MANAGEMENT SYSTEM

(71) Applicants: Hyundai Motor Company, Seoul (KR); Kia Motors Corporation, Seoul (KR)

(72) Inventors: Kyung In Min, Gyeonggi-Do (KR); Yoon Jun Lee, Seoul (KR); Dong Il Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/622,641

(22) Filed: Feb. 13, 2015

(65) Prior Publication Data

US 2016/0107525 A1    Apr. 21, 2016

(30) Foreign Application Priority Data

Oct. 20, 2014    (KR) ........................ 10-2014-0142101

(51) Int. Cl.
*B60L 3/00*    (2006.01)
*B60L 3/04*    (2006.01)

(52) U.S. Cl.
CPC    *B60L 3/0046* (2013.01); *B60L 3/04* (2013.01)

(58) Field of Classification Search
None
See application file for complete search history.

(56) References Cited

U.S. PATENT DOCUMENTS

| | | | |
|---|---|---|---|
| 2013/0049971 A1* | 2/2013 | Hermann | H01M 10/482 340/636.1 |
| 2013/0229742 A1* | 9/2013 | Auguet | B60L 3/0046 361/114 |
| 2013/0300430 A1* | 11/2013 | Lindsay | B60L 3/0046 324/522 |
| 2014/0039740 A1* | 2/2014 | Kwon | G06F 17/00 701/22 |

FOREIGN PATENT DOCUMENTS

| | | |
|---|---|---|
| KR | 10-2008-0030753 A | 4/2008 |
| KR | 10-2009-0055077 | 5/2008 |
| KR | 10-2014-0068567 A | 6/2009 |
| KR | 10-2010-0104943 A | 9/2010 |
| KR | 10-20140017783 A | 2/2014 |
| KR | 10-2008-0047055 A | 6/2014 |

* cited by examiner

*Primary Examiner* — Thomas Tarcza
*Assistant Examiner* — Garrett Evans
(74) *Attorney, Agent, or Firm* — Mintz Levin Cohn Ferris Glovsky and Popeo, P.C.; Peter F. Corless

(57) ABSTRACT

A method for reconnecting a relay in a vehicle battery management system includes: measuring an insulation resistance between a positive electrode or a negative electrode of a battery and a vehicle chassis; turning off each of relays connected between the positive and negative electrodes of the battery and a load when the measured insulation resistance is less than a reference value; re-measuring the insulation resistance; and performing a relay-on sequence for turning on each of the relays when the resistance value of the re-measured insulation resistance is greater than the reference value. A relay reconnection number of the relay-on sequence, based on a repetition of the measuring and re-measuring, is set and limited so as to not exceed a threshold value.

15 Claims, 3 Drawing Sheets

METHOD FOR RECONNECTING A RELAY IN A VEHICLE BATTERY MANAGEMENT SYSTEM

CROSS-REFERENCE TO RELATED APPLICATION

This application is based on and claims priority to Korean Patent Application No. 10-2014-0142101, filed on Oct. 20, 2014 in the Korean Intellectual Property Office, the disclosure of which is incorporated herein in its entirety by reference.

BACKGROUND

1. Technical Field

The present disclosure relates to a method for reconnecting a relay in a vehicle battery management system, and more particularly, to a method for reconnecting a relay in a vehicle battery management system capable of eliminating anxiety by minimizing the reconnection of a relay and enabling the normal drive of a vehicle by prohibiting the operation of a fault region.

2. Description of the Related Art

If a failure of the vehicle battery system occurs, a battery management system (BMS) can block the high voltage relay in order to secure the safety of the system. After blocking the relay, the vehicle runs as a limphome mode, where the vehicle may only be driven by the engine. The limphome mode supports only minimal drive for moving the vehicle to a safe zone.

If the vehicle battery system is returned to a normal state after the failure of the battery system, the BMS determines it without any driver's manual action and may perform a relay on sequence which applies a power to the high voltage system again. This is called relay reconnection. Accordingly, if the battery system is determined as a normal state, without any manual action of the driver, the vehicle is automatically recovered, and thus, secondary accidents that may occur while driving can be prevented.

However, should an irreparable failure occur, the BMS blocks the high voltage relay and shuts down it so that a power is not supplied to the high voltage parts. By the temporal return to a normal state, the high voltage relay is turned on again, and if this process is repeated, there can be a problem in which anxiety is caused for the driver.

SUMMARY

Thus, in order to solve the above problems, the object of the present disclosure is to provide a method for reconnecting a relay in a vehicle battery management system, capable of eliminating anxiety which can be generated by the repetition of a reconnection, by determining whether a high voltage relay is reconnected so as to separate the inside and the outside of the battery system when the high voltage relay is blocked, based on the occurrence of an insulation resistance failure. The method may also minimize the unnecessary reconnection of a relay and enable the normal drive of a vehicle by warning the operation prohibition of the fault region in the high voltage device, such as a motor, the compressor of an air conditioner, and the like.

According to embodiments of the present disclosure, a method for reconnecting a relay in a vehicle battery management system includes: measuring an insulation resistance between a positive electrode or a negative electrode of a battery and a vehicle chassis; turning off each of relays connected between the positive and negative electrodes of the battery and a load when the measured insulation resistance is less than a reference value; re-measuring the insulation resistance; and performing a relay-on sequence for turning on each of the relays when the resistance value of the re-measured insulation resistance is greater than the reference value. A relay reconnection number of the relay-on sequence, based on a repetition of the measuring and re-measuring, is set and limited so as to not exceed a threshold value.

The reference value may be set to a value greater than 100 k$\Omega$ (e.g., 300 k$\Omega$), and the threshold value may be set to a value greater than 2 (e.g., 3).

The method may further include: generating a message indicating an off-state of a corresponding system for one or more loads outside the battery system and providing the off-state to an in-vehicle display device, when the re-measured resistance value is greater than the reference value after turning off each of the relays, and when a failure occurrence is detected in which the firstly measured resistance value of the insulation resistance is less than the reference value. Here, the corresponding load selected by a user using a dashboard in a vehicle may be turned off.

The method may further include: performing the relay-on sequence when the relay is turned off by another cause of failure in the battery management system during the re-measuring of the insulation resistance, when the re-measured resistance value is greater than the reference value, and when the other cause of failure is not detected in the battery management system after turning off the relay.

When the re-measured resistance value is less than the reference value, or when the relay reconnection number exceeds the threshold value, the vehicle may run in a limphome mode.

Furthermore, according to embodiments of the present disclosure, a vehicle battery management system includes: a counter; an insulation resistance measurer configured to measure an insulation resistance between a positive electrode or a negative electrode of a battery and a vehicle chassis; and a controller configured to turn off each of relays connected between the positive and negative electrodes of the battery and a load when the measured insulation resistance is less than a reference value and to perform a relay-on sequence for turning on each of the relays when the resistance value of the insulation resistance, which is re-measured by the insulation resistance measurer, is greater than the reference value. A coefficient of the counter is increased based on the insulation resistance measurement of the insulation resistance measurer, the insulation resistance re-measurement of the controller, and a repetition of a relay-on sequence, and a relay reconnection number of the relay-on sequence is set to a value less than a threshold value based on the coefficient of the counter.

The reference value may be set to a value greater than 100 k$\Omega$ (e.g., 300 k$\Omega$), and the threshold value may be set to a value greater than 2 (e.g., 3).

A vehicle battery management system may further include: a display information provider configured to generate a message indicating an off-state of a corresponding system for one or more loads outside the battery system and provide the off-state to an in-vehicle display device, when the re-measured resistance value is greater than the reference value after turning off each of the relays, and when a failure occurrence is detected in which the firstly measured resistance value of the insulation resistance is less than the reference value. Here, the corresponding load selected by a user using a dashboard in a vehicle may be turned off.

The controller performs the relay-on sequence when the relay is turned off by another cause of failure in the controller, when the re-measured resistance value is greater than the reference value, and when the other cause of failure is not detected in the battery management system after turning off the relay.

When the re-measured resistance value is less than the reference value, or when the relay reconnection number exceeds the threshold value, the vehicle runs in a limphome mode.

Furthermore, according to embodiments of the present disclosure, a non-transitory computer readable medium containing program instructions for reconnecting a relay in a vehicle battery management system includes: program instructions that measure an insulation resistance between a positive electrode or a negative electrode of a battery and a vehicle chassis; program instructions that turn off each of relays connected between the positive and negative electrodes of the battery and a load when the measured insulation resistance is less than a reference value; program instructions that re-measure the insulation resistance; and program instructions that perform a relay-on sequence for turning on each of the relays when the resistance value of the re-measured insulation resistance is greater than the reference value, wherein a relay reconnection number of the relay-on sequence, based on a repetition of the measuring and re-measuring, is set and limited so as to not exceed a threshold value.

According to techniques disclosed herein, unnecessary reconnections of a relay can be minimized, and anxiety generated by repeated reconnection of a high voltage relay separating the inside and the outside of the battery system when the high voltage relay is blocked due to the occurrence of an insulation resistance failure can be eliminated. Further, quick response to a failure is possible by promptly blocking the operation for the fault region by a user and warning the operation prohibition of the fault region in the high voltage device, such as a motor, the compressor of an air conditioner, and the like, while inconvenience is minimized by enabling a drive for a failure or an abnormal symptom outside the battery system.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EMBODIMENTS

Figure 1:
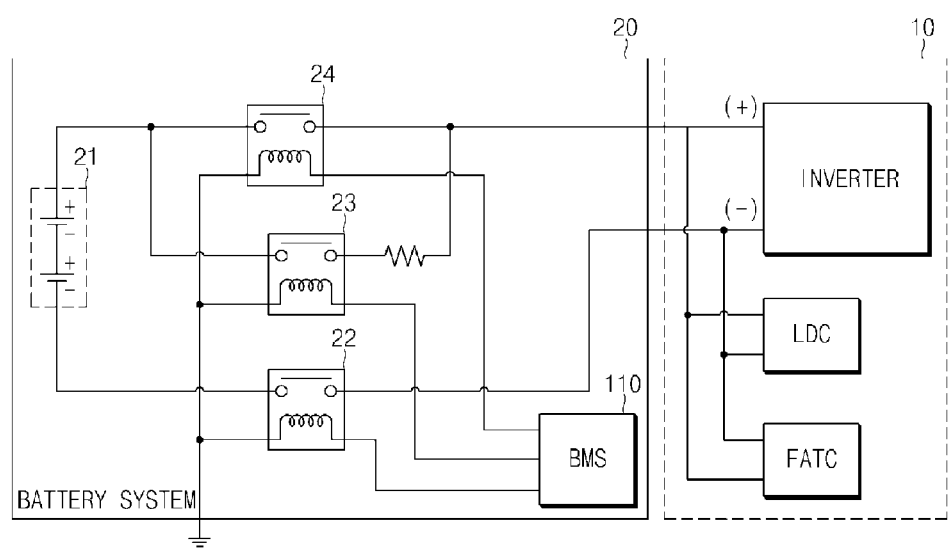
FIG. 1 is a diagram for explaining a vehicle battery management system according to embodiments of the present disclosure.

Hereinafter, the present disclosure will be described in detail with reference to the drawings. At this time, in each of the drawings, the same components are denoted by the same reference symbols, if possible. Further, detailed descriptions for the previously known features and/or configurations are omitted. In the description below, parts required to understand operations in accordance with various embodiments will be explained in priority, the descriptions for elements, which may obscure the gist of the descriptions, are omitted. It can also be shown schematically some of the elements in the figures are exaggerated or omitted. Not utterly reflect an actual size to the size of each element, so that they are not intended to limit the content that is specified here by the relative size and spacing of the elements drawn in the figure, respectively.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a diagram for explaining a vehicle battery management system 110 according to embodiments of the present disclosure. As shown in FIG. 1, in a battery system 20 which takes charge of the power supply and management to a load 10 including power components such as a high voltage air conditioner inverter, a low voltage DC/DC converter (LDC), etc. or all electronic components in vehicle such as a Full Automatic Temperature Control (FATC) system, a Positive Temperature Coefficient (PTC) heater, three-phase motor, etc., a vehicle battery management system 110 according to embodiments of the present disclosure monitors occurrence of a failure and controls open and close of high voltage relays 22, 23, 24 so that the battery system 20 is normally operated.

The battery system 20, in addition to the battery management system 110, that is, Battery Management System (BMS), includes a battery 21 for supplying a power to various loads 10 and each high voltage relays 22, 23, 24 connected between the positive and negative electrodes of the battery 21 and a load. The battery management system 110 can detect an insulation resistance between the positive or negative electrode and a vehicle chassis by using various detection signals from various sensors or CAN, and in addition, can properly turn off high voltage relays 22, 23, 24 according to the corresponding failure when the shortage in other load or other abnormal state is generated, and if the corresponding system return to a normal state after a failure is generated, the relay on sequence applying the power of the battery 21 to the load 20 can be performed again.

For example, when performing the relay on sequence, a negative main relay 22, a positive precharge relay 23 including a resistance R and a positive main relay 24 can be sequentially and properly turned on. Since the relay on sequence is well known, a detailed description thereof will be omitted.

In particular, in the present disclosure, when blocking (i.e., turning off) high voltage relays 22, 23, 24 according to a failure of an insulation resistance between a positive or negative electrode of the battery 21 and the vehicle chassis, anxiety which can be generated by the repetition of a reconnection can be eliminated by determining whether a high voltage relays 22, 23, 24 are reconnected separating the inside and the outside of the battery system and minimizing the unnecessary reconnection of a relay. Further, quick response for a failure is possible by promptly blocking the operation for the fault region by a user, by warning the operation prohibition of the fault region in the high voltage device such as a motor, the compressor of an air conditioner and the like, while inconvenience is minimized by enabling a drive for a failure or an abnormal symptom outside the battery system 20.

Figure 2:
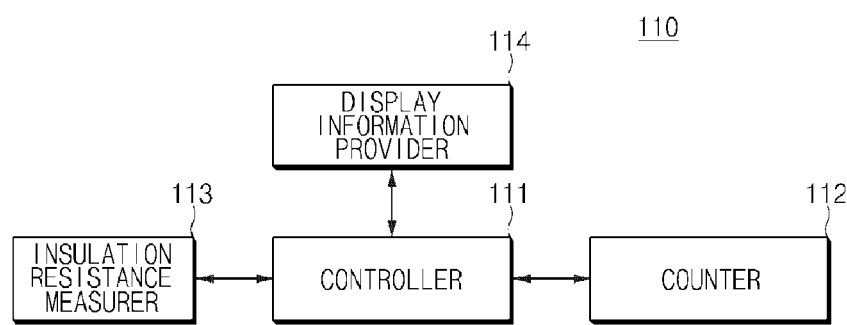
FIG. 2 is a specific block diagram of a vehicle battery management system according to embodiments of the present disclosure.

FIG. 2 is a specific block diagram of a vehicle battery management system according to embodiments of the present disclosure. As shown in FIG. 2, a vehicle battery management system 110 according to embodiments of the present disclosure may include a controller 111, a counter 112, an insulation resistance measurer 113 and a display information provider 114. Each of component parts of the vehicle battery management system 110 can be implemented in hardware, software or a combination thereof. The controller 111 may be a semiconductor processor for the overall control of the component parts of the vehicle battery management system 110, and it can be also implemented to perform this function, including any one or more of the functions of each of component parts.

First, the functions of component parts of the vehicle battery management system 110 will be briefly described. The insulation measurer 113 measures the insulation resistance between a positive or negative electrode of the battery 21 and a vehicle chassis. The insulation measurer 113 may measure the insulation resistance by using a predetermined sensor, and the insulation resistance between any one of the positive or negative electrode of the battery 21 and the chassis may be measured, and also, the insulation resistance for each of the positive and negative electrodes of the battery 21 may be measured.

The controller 111 turns off each of relays 22, 23, 24 connected between the positive and negative electrodes of the battery 21 and the load, depending on the detection of failure occurrence which the resistance value of the insulation resistance is less than a reference value (e.g., 300 kΩ), and if the resistance value of the insulation resistance re-measured by the insulation resistance measurer 113 is greater than the reference value (e.g., 300 kΩ), the relay on sequence for turning on each of relays 22, 23, 24 can be performed. Here, although the reference value of the insulation resistance is described by an example of 300 kΩ, this is only one example, and since it may vary depending on each of vehicles and may vary slightly depending on environment factors on driving, it may be properly set with more than 100 kΩ.

In particular, in the present disclosure, according to the above insulation resistance measurement of the insulation resistance measurer 113, and the above insulation resistance re-measurement of the controller 111 and the repetition of the relay on sequence performance, in order to record the number of the repetition, the count value of the counter 112 is increased, and based on the count value of the counter 112, the relay reconnection number by the relay on sequence is set to less than a threshold value (e.g., 3) and is limited. That is, if the resistance value of the above re-measured insulation resistance is greater than a reference value (e.g., 300 kΩ), the controller 111 can perform the relay on sequence for each of relays 22, 23, 24, but the relay on sequence is performed by the number less than a threshold value (e.g., 3 times) of the relay reconnection number. Here, the threshold value of the reconnection number is described as an example of 3 times, but it is only an example and it may be properly set to more than 2 times depending on a situation. According to this, by minimizing the unnecessary reconnection of relays 22, 23, 24, anxiety which can occurred depending on the repetition of the reconnection can be eliminated.

At this time, after the display information provider 114 turns off each of relays 22, 23, 24 depending on the detection of a failure occurrence which the resistance value of the insulation resistance firstly measured by the insulation resistance measurer 113 as the above described is less than a reference value (e.g., 300 kΩ), if the re-measured resistance value is greater than a reference value (e.g., 300 kΩ), in order to warn the operation prohibition of the fault region in a high voltage device such as a motor, an air conditioner compressor, etc., a message (e.g., off warning of an air conditioner, PTC heater, etc.) indicating off of the corresponding system for one or more load 10 outside the battery system 20 of the loads 10 is generated and may be provided to an in-vehicle display device. The in-vehicle display device may be a cluster form of the vehicle inside dashboard.

Figure 3:
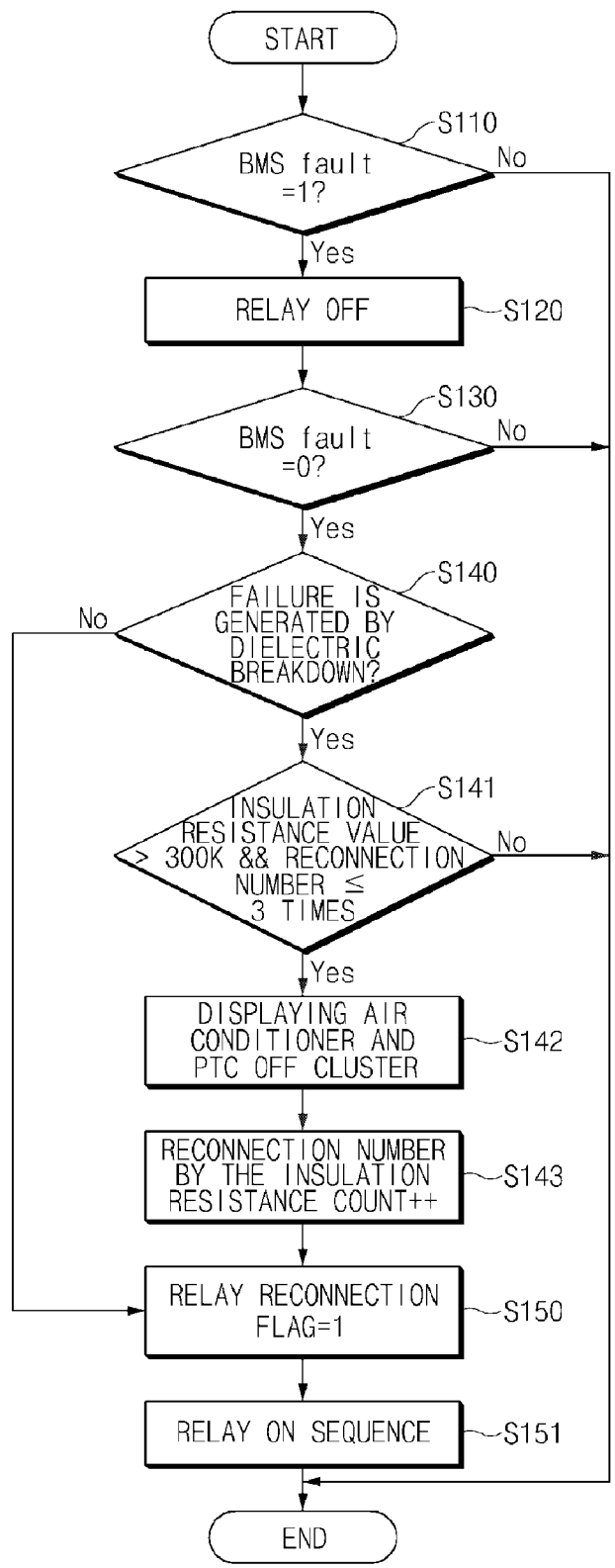
FIG. 3 is a flow chart for explaining the operation of a vehicle battery management system according to embodiments of the present disclosure.

FIG. 3 is a flow chart for explaining the operation of a vehicle battery management system 110 according to embodiments of the present disclosure. First, the vehicle battery management system 110 can detect failure occurrence according to various detection signals depending on the corresponding failure when the shortage in various sensors or a load 10 from a CAN, the battery system 20, etc. or other failure is occurred, and in particular, if the resistance value of the corresponding insulation resistance measured by measuring the insulation resistance between a positive or negative electrode of the battery 21 and the chassis of a vehicle through the insulation resistance measurer 113 is less than a reference value (e.g., 300 kΩ), the failure occurrence can be detected (BMS fault=1) S110.

The controller 111 turns off (i.e., blocks) each of relays 22, 23, 24 connected between a positive and negative electrodes of the battery 21 and a load, depending on the detection of the failure occurrence which the resistance value of the insulation resistance measured through the insulation measurer 113 is less than a reference value (e.g., 300 kΩ) S120. Here, the controller 111 may determine the time which the resistance value of the insulation resistance is less than the reference value (e.g., 300 kΩ) is maintained during the time longer than a predetermined time (example e.g., 24 seconds), as failure occurrence. Also, the controller 111 may turns off the relay by detecting (BMS fault=1) failure occurrence by other failure cause depending on the above various detecting signal in addition to the above comparison determination of the insulation resistance as the above described.

After turning off relays 22, 23, 24, if other failure occurrence is not detected (BMS fault=0), the controller 111 starts the determination for whether the high voltage relays 22, 23, 24 is reconnected (S130). After turning off relays 22, 23, 24, the controller 111 control to re-measure the insulation resistance through the insulation resistance measurer 113 by generating a control signal.

If the resistance value of the insulation resistance is less than a reference value (e.g., 300 kΩ), when the relays 22, 23, 24 are turned off by other failure cause, if the resistance value re-measured by the insulation resistance measurer 113 is greater than a reference value (e.g., 300 kΩ) and other failure cause is not detected after turning off the relays 22, 23, 24 S140, the controller 111 generates a command for reconnecting a relay (relay reconnection flag=1) S150 and may turn on the relays 22, 23, 24 through the relay on sequence S150. This case corresponds to the case which the insulation resistance is returned to a normal state after turning off the relays 22, 23, 24 when a temporal shortage phenomenon by foreign substance, etc. in the load 10, the battery system 20 is occurred or other failure is generated.

On the other hand, if the relays 22, 23, 24 are turned off due to failure occurrence by the case which the resistance value of the insulation resistance is less than a reference value (e.g., 300 kΩ), if the resistance value re-measured by the insulation resistance measurer 113 is greater than a reference value (e.g., 300 kΩ) and other failure cause is not detected after turning off the relays 22, 23, 24 S140, the reconnection number of the relay on sequence for turning on each of relays 22, 23, 24 is performed by a threshold value (e.g., 3 times) S141~S143, S150~S151. According to this, by minimizing the unnecessary reconnection of relays 22, 23, 24, anxiety which can be generated due to repetition of the reconnection can be eliminated.

That is, if the resistance value of the above re-measured insulation resistance is greater than a reference value (e.g., 3 times), the controller 111 performs the relay on sequence which the relay reconnection number is less than a threshold value (e.g., 3 times) S141. At this time, if the re-measured resistance is less than a reference value (e.g., 300 kΩ) or the relay reconnection number exceeds a threshold (e.g., 3 times), it is determined that the failure inside the battery system 20 or other failure is generated, the reconnection of the relay is stopped, and immediately, the vehicle may run as a limphome mode.

If the above re-measured resistance value greater than a reference value (e.g., 300 kΩ) and the reconnection number of the relay less than a threshold (e.g., 3 times), in order to warn the operation prohibition of the fault region in a high voltage device such as a motor, an air conditioner compressor, a message (e.g., off warning for an air conditioner, PTC heater, etc.) indicating an off state of the corresponding system for one or more load 10 outside the battery system 20 of the loads 10 is generated and may be provided to an in-vehicle display device. The in-vehicle display device may be a cluster form of the vehicle inside dashboard S142. By turning off the operation of the corresponding load selected in the dashboard inside the vehicle, an electric shock depending on dielectric breakdown or an error on the operation of the vehicle can be previously prevented.

After that, in order to repeat the performance of the above insulation resistance re-measurement of the insulation resistance measurer 113, and the above insulation resistance re-measurement and the relay on sequence by a threshold value (e.g., 3 times), the controller 111 increase a coefficient value of a counter 112 (count++) S143. The controller 111 generates a command for the relay reconnection (relay reconnection flag=1) S150 and turns on the relays 22, 23, 24 through the relay on sequence S151.

After that, if the resistance value of the corresponding insulation resistance measured by measuring the insulation resistance between a positive and negative electrodes of the battery 21 and the vehicle chassis through the insulation resistance measurer 113 is less than a reference value (e.g., 300 kΩ) or failure occurrence by other cause is detected (BMS fault=1), the above S110~S151 process of FIG. 3 is repeated by a threshold value (e.g., 3 times).

As the above described, by a method for reconnecting a relay in a vehicle battery management system 110 according to the present disclosure, anxiety generated by repeated reconnection of a high voltage relay separating the inside and the outside of the battery system 20 when the high voltage relay is blocked due to the occurrence of an insulation resistance failure can be eliminated. Also, the unnecessary reconnection of a relay can be minimized. Furthermore, a quick response for a failure is possible by promptly blocking the operation for the fault region by a user, by warning the operation prohibition of the fault region in the high voltage device, such as a motor, the compressor of an air conditioner, and the like, while inconvenience is minimized by enabling a drive for a failure or an abnormal symptom outside the battery system 20.

In the above description, the present disclosure has been described through specific elements, embodiments, and drawings, it is only provided to assist in a comprehensive understanding of the present disclosure, the present disclosure is not limited to the embodiments, and it will be understood by those skilled in the art that the present disclosure may be implemented as various modifications and variations without departing from the spirit of the present disclosure. Accordingly, the scope of the present disclosure is recited in the appended claims, not the above descriptions, and all differences within the equivalent scope of the present disclosure will be construed as being included in the present disclosure.

What is claimed is:

1. A method for reconnecting a relay in a vehicle battery management system comprising:
   measuring an insulation resistance between a positive electrode or a negative electrode of a battery and a vehicle chassis;
   turning off each of relays connected between the positive and negative electrodes of the battery and a load when the measured insulation resistance is less than a reference value;
   re-measuring the insulation resistance; and
   performing a relay-on sequence for turning on each of the relays when the resistance value of the re-measured insulation resistance is greater than the reference value,
   wherein a relay reconnection number of the relay-on sequence, based on a repetition of the measuring and re-measuring, is set and limited so as to not exceed a threshold value.

2. The method for reconnecting a relay in a vehicle battery management system according to claim 1, wherein the reference value is set to a value greater than 100 kΩ.

3. The method for reconnecting a relay in a vehicle battery management system according to claim 1, wherein the threshold value is set to a value greater than 2.

4. The method for reconnecting a relay in a vehicle battery management system according to claim 1, further comprising:
   generating a message indicating an off-state of a corresponding system for one or more loads outside the battery system and providing the off-state to an in-vehicle display device, when the re-measured resistance value is greater than the reference value after turning off each of the relays, and when a failure occurrence is detected in which the firstly measured resistance value of the insulation resistance is less than the reference value.

5. The method for reconnecting a relay in a vehicle battery management system according to claim 4, further comprising:
   turning off the corresponding load selected by a user using a dashboard in a vehicle.

6. The method for reconnecting a relay in a vehicle battery management system according to claim 1, further comprising:
   performing the relay-on sequence when the relay is turned off by another cause of failure in the battery management system during the re-measuring of the insulation resistance, when the re-measured resistance value is greater than the reference value, and when the other cause of failure is not detected in the battery management system after turning off the relay.

7. The method for reconnecting a relay in a vehicle battery management system according to claim 1, wherein when the re-measured resistance value is less than the reference value, or when the relay reconnection number exceeds the threshold value, the vehicle runs in a limphome mode.

8. A vehicle battery management system comprising:
   a counter;
   an insulation resistance measurer configured to measure an insulation resistance between a positive electrode or a negative electrode of a battery and a vehicle chassis; and
   a controller configured to turn off each of relays connected between the positive and negative electrodes of the battery and a load when the measured insulation resistance is less than a reference value and to perform a relay-on sequence for turning on each of the relays when the resistance value of the insulation resistance, which is re-measured by the insulation resistance measurer, is greater than the reference value,
   wherein a coefficient of the counter is increased based on the insulation resistance measurement of the insulation resistance measurer, the insulation resistance re-measurement of the controller, and a repetition of a relay-on sequence, and a relay reconnection number of the relay-on sequence is set to a value less than a threshold value based on the coefficient of the counter.

9. The vehicle battery management system according to claim 8, wherein the reference value is set to a value greater than 100 kΩ.

10. The vehicle battery management system according to claim 8, wherein the threshold value is set to a value greater than 2.

11. The vehicle battery management system according to claim 8, further comprising:
   a display information provider configured to generate a message indicating an off-state of a corresponding system for one or more loads outside the battery system and provide the off-state to an in-vehicle display device, when the re-measured resistance value is greater than the reference value after turning off each of the relays, and when a failure occurrence is detected in which the firstly measured resistance value of the insulation resistance is less than the reference value.

12. The vehicle battery management system according to claim 11, wherein the corresponding load selected by a user using a dashboard in a vehicle is turned off.

13. The vehicle battery management system according to claim 8, wherein the controller performs the relay-on sequence when the relay is turned off by another cause of failure in the controller, when the re-measured resistance value is greater than the reference value, and when the other cause of failure is not detected in the battery management system after turning off the relay.

14. The vehicle battery management system according to claim 8, wherein when the re-measured resistance value is less than the reference value, or when the relay reconnection number exceeds the threshold value, the vehicle runs in a limphome mode.

15. A non-transitory computer readable medium containing program instructions for reconnecting a relay in a vehicle battery management system, the computer readable medium comprising:
   program instructions that measure an insulation resistance between a positive electrode or a negative electrode of a battery and a vehicle chassis;
   program instructions that turn off each of relays connected between the positive and negative electrodes of the battery and a load when the measured insulation resistance is less than a reference value;
   program instructions that re-measure the insulation resistance; and
   program instructions that perform a relay-on sequence for turning on each of the relays when the resistance value of the re-measured insulation resistance is greater than the reference value,
   wherein a relay reconnection number of the relay-on sequence, based on a repetition of the measuring and re-measuring, is set and limited so as to not exceed a threshold value.

* * * * *